United States Patent [19]
Gordon et al.

[11] 3,855,380
[45] Dec. 17, 1974

[54] METHOD FOR MANUFACTURING UNITARY, SEAMLESS, COLLAPSIBLE THERMOPLASTIC TUBES

[75] Inventors: James O. Gordon, Wheeling, Ohio;
Bruce T. Cleevely, Pittsburgh, Pa.;
William B. Niemi, East Longmeadow, Mass.

[73] Assignee: Wheeling Stamping Co., Wheeling, W. Va.

[22] Filed: Nov. 6, 1973

[21] Appl. No.: 413,194

Related U.S. Application Data
[63] Continuation of Ser. No. 151,281, June 9, 1971, abandoned.

[52] U.S. Cl.............. 264/97, 264/154, 264/161, 264/318, 425/DIG. 209, 425/DIG. 214
[51] Int. Cl. .................. B29c 17/07, B29c 17/10
[58] Field of Search ......... 264/89, 94, 97, 318, 154, 264/155, 161; 425/242 B, 324 B, 326, 387 B, DIG. 209, 290, 291, 806, DIG. 214

[56] References Cited
UNITED STATES PATENTS

| | | | |
|---|---|---|---|
| 2,515,093 | 7/1950 | Mills | 264/98 X |
| 3,100,913 | 8/1963 | De Matteo | 425/437 X |
| 3,100,913 | 8/1963 | DeMatteo | 425/437 X |
| 3,310,621 | 3/1967 | Valyi | 264/97 |
| 3,337,666 | 8/1967 | Wilkins | 264/97 |
| 3,471,896 | 10/1969 | Ninneman | 264/97 X |

*Primary Examiner*—Jan H. Silbaugh
*Attorney, Agent, or Firm*—Parmelee, Miller, Welsh & Kratz

[57] ABSTRACT

Unitary, seamless, collapsible thermoplastic tubes having a threaded neck are formed by an injection-blow mold process. A thermoplastic parison is formed around a parison pin in an injection mold cavity and the pin transferred to a blow mold wherein the parison is expanded to conform with the configuration of a blow mold cavity and form a threaded neck. The expanded tube has a body open at one end while the opposite end comprises a shoulder and an externally threaded neck, which neck is sealed by a thermoplastic membrane. In the preferred process, the neck membrane is punctured to form an orifice therein and the opposite open end of the body is trimmed to a predetermined size.

12 Claims, 15 Drawing Figures

INVENTORS
JAMES O. GORDON,
BRUCE T. CLEEVELY &
WILLIAM B. NIEMI

Parmelee, Utzler & Welsh
ATTORNEYS

INVENTORS
JAMES O. GORDON,
BRUCE T. CLEEVELY &
WILLIAM B. NIEMI

ATTORNEYS

INVENTORS.
JAMES O. GORDON,
BRUCE T. CLEEVELY &
WILLIAM B. NIEMI
By Parmelee, Utzler & Welsh
Attorneys

METHOD FOR MANUFACTURING UNITARY, SEAMLESS, COLLAPSIBLE THERMOPLASTIC TUBES

This is a continuation of application Ser. No. 151,281, filed June 9, 1971, now abandoned.

BACKGROUND OF THE INVENTION

Packaging tubes are used for a multitude of consumer products, such as dentifrices, cosmetics, glues, and the like. While many of these tubes are produced from lead or aluminum, the use of thermoplastic tubes for packaging purposes is ever increasing. Because such tubes generally have a shoulder and narrow neck attached to the body of the tube, the preparation of thermoplastic tubes has, for the most part, involved the welding or soldering together of various tube parts, such as a tube body and a threaded head. Various extrusion or injection molding and welding processes are known, such as those disclosed in Flax U.S. Pat. Nos. 3,172,933 and 3,446,688, and Strahm U.S. Pat. No. 2,673,374. Problems normally associated with welded materials, such as risk of weakening of the weld, and the time necessary to carry out such welding, have raised difficulties with the making and using of such tubes.

In Valyi U.S. Pat. No. 3,310,621, a method for making plastic tubes is disclosed wherein a parison is formed and the parison later expanded in a blow mold while the injection molded threaded neck of the tube is confined throughout the process. Thus, the neck itself is not expanded but rather retains the thicker cross-section and other characteristics of an injection-molded member.

While containers have been produced efficiently by injection-blow mold processes, the use of such a process for the formation of collapsible plastic tubes has previously been found to be impractical. We have discovered that by following specific procedural steps and by forming a tube that has a sealed threaded neck formed by an expansion of a hot parison, with the sealed neck subsequently punctured to form an orifice for exuding the tube contents, an injection-blow mold process is provided which produces a unitary, seamless, collapsible plastic tube efficiently and economically.

SUMMARY OF THE INVENTION

A unitary, seamless, collapsible plastic tube having a narrow, externally threaded neck is produced by an injection-blow mold process. Thermoplastic material is injected into an injection mold cavity, which is formed between a parison pin and the mold wall sections which surround the pin. The pin has a body portion and shoulder portion, the shoulder portion terminating as a narrow neck. The parison which is formed by encapsulating the pin in hot thermoplastic material has a sealed neck and corresponds to the shape of the pin. The pin, with its parison is then transferred to a blow mold cavity, which blow mold cavity has the dimensions of the desired end tube, including a threaded neck. Fluid, such as air, is injected through the parison pin to expand the parison to the confines of the blow mold cavity, forming an exterior thread on the neck portion of the tube. The expanded tube is cooled and ejected from the blow mold cavity. The tube may be sold in the form that is ejected from the blow mold, with a membrane across the neck, or the tube body may be trimmed to a predetermined size and the neck sealing membrane punctured and the tube marketed with a specific orifice size.

BRIEF DESCRIPTION OF THE DRAWINGS

The invention is further described in the attached drawings wherein.

DETAILED DESCRIPTION

Figure 1:
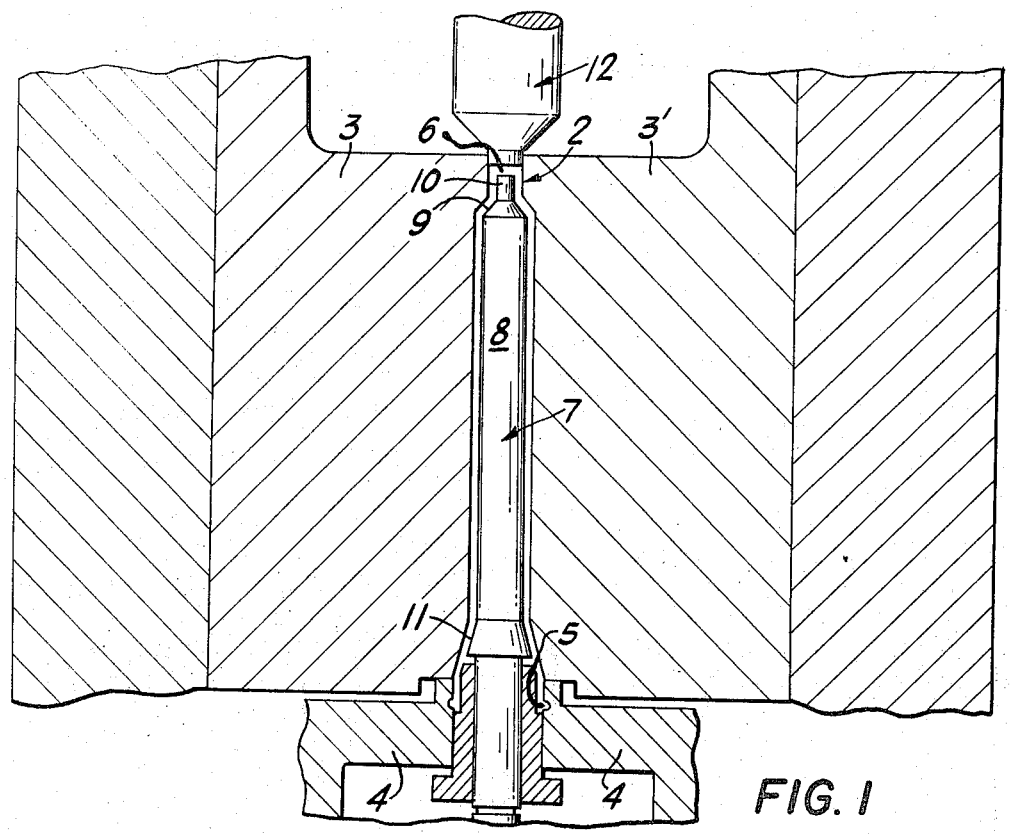
FIG. 1 is a cross-sectional view of an injection mold illustrating the injection mold wall section, parison pin and an injection device.

Referring now to FIG. 1, the present process is initiated through the formation of a parison in an injection mold cavity. The mold cavity 2 is formed by two mating mold wall sections 3 and 3', a separable sealing ring 4 having an annular groove 5, and an injection gate 6. Extending through the sealing ring 4, axially disposed between the mold cavity walls, is a parison pin 7, as illustrated, which has a main body portion 8, with a shoulder 9, which shoulder terminates as a narrow neck portion 10. The neck portion 10 terminates adjacent gate 6, while the end of the parison pin 7 adjacent the sealing ring 4 is flared, as shown at 11. The mold wall sections 3 and 3' are designed to conform to the shape of the parison pin 7 disposed between the mold sections, and form a cavity 2 of a predetermined configuration. Molten thermoplastic material is charged from a source, not shown, to an injection device 12, and through the gate 6 into the cavity 2.

Figure 2:
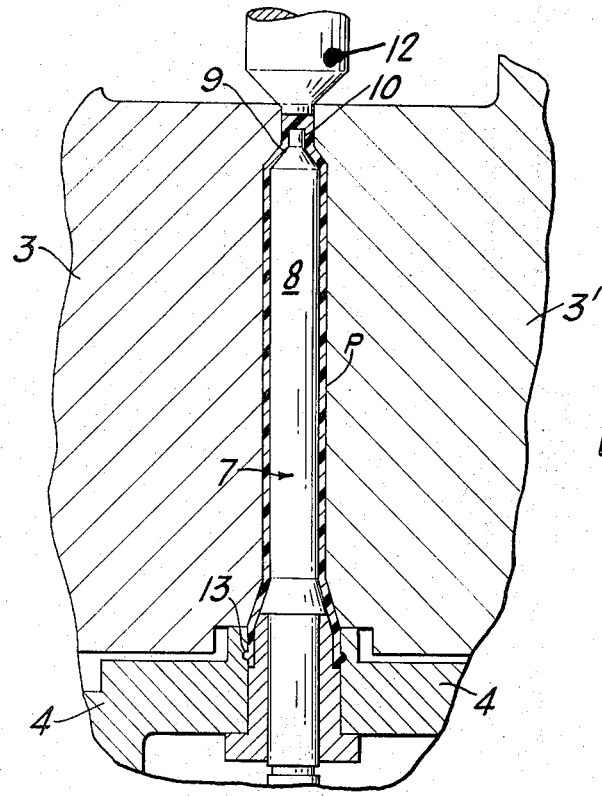
FIG. 2 is a view corresponding to FIG. 1 illustrating the parison formed by injecting thermoplastic material into the injection mold cavity.
Figure 3:
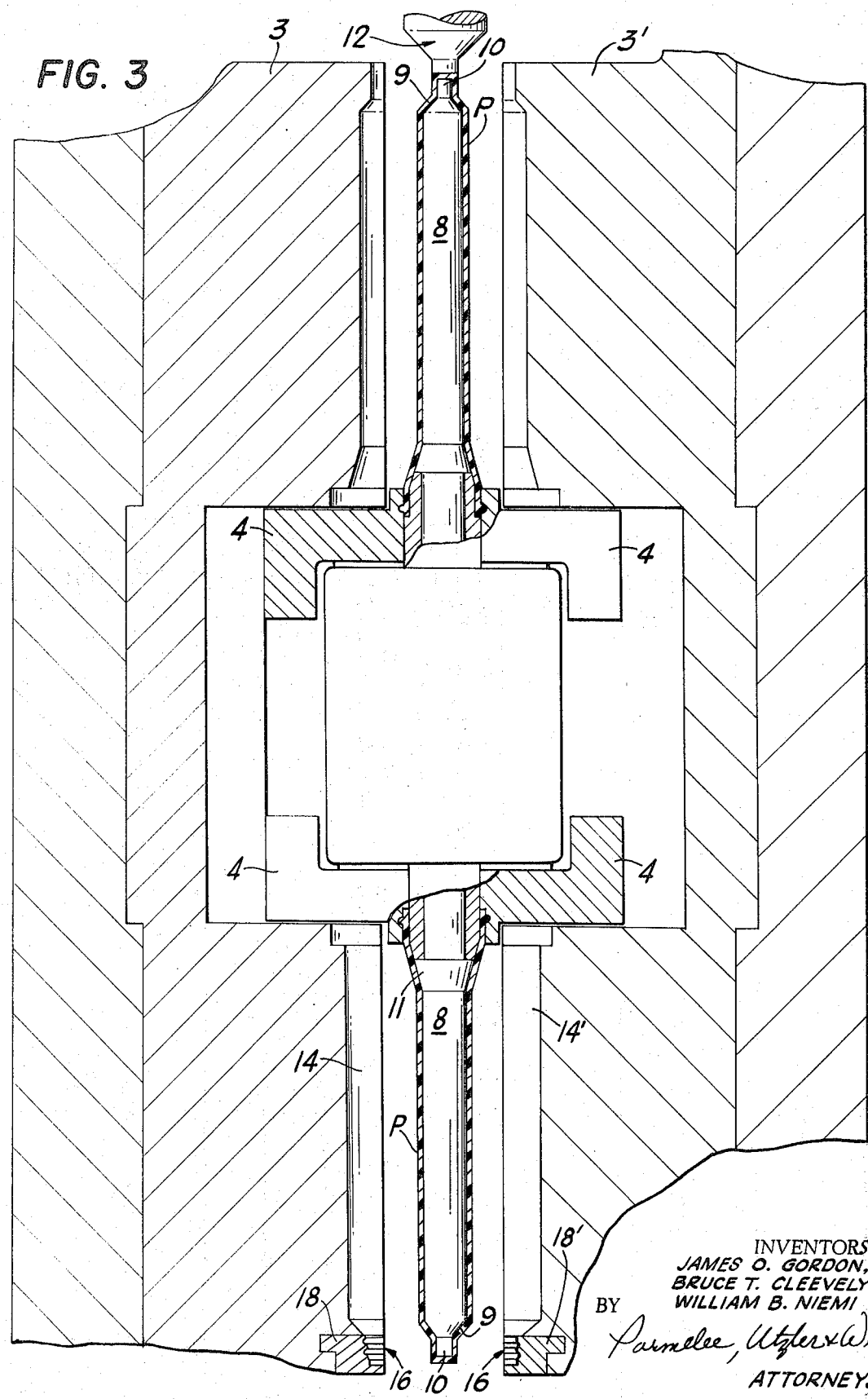
FIG. 3 is a cross-sectional view of a combination injection-blow mold apparatus, the upper half of which illustrates the parison formed on the parison pin when the mold wall sections are opened to permit transfer of the parison pin and parison to a blow mold, and the lower half of which illustrates a blow mold with the mold wall sections in opened position immediately upon transfer of the parison pin and parison thereto from the injection mold.

The thermoplastic material used in the present invention may be any of the thermoplastic materials which flow sufficiently when heated and masticated for injection molding and which are expandable to form the tube body and the external threading on the neck of the tube. Especially useful materials include polyethylene and copolymers of polyethylene but other thermoplastics may also be used. The injection device 12 and mold wall sections 3 and 3' may be of conventional design. Various cooling ducts and chambers, suitable guide pins, and other details of the tooling such as the source and conduits for air are not shown in the drawings and would vary with different apparatus. The molten thermoplastic material flows through the gate 6 and around the parison pin 7, into the sealing ring 4 and fills the annular groove 5 forming a rib 13, to completely fill the cavity 2 as shown in FIG. 2. Upon completion of the filling step, the parison pin, except for that portion enclosed in the sealing ring 4 will be encapsulated in the hot thermoplastic material forming a parison p. The flow of thermoplastic material from the injection device 12 is then terminated. The mold wall sections 3 and 3' are then separated (FIG. 3), while the ring 4 remains in closed position, with the rib 13 of thermoplastic material held in groove 5, to retain the parison p, which encapsulates the body portion 8, shoulder 9, and neck 10 of the parison pin 7. With the injection mold walls 3 and 3' in open position, the parison pin is free to be transferred to a blow mold cavity.

Figure 4:
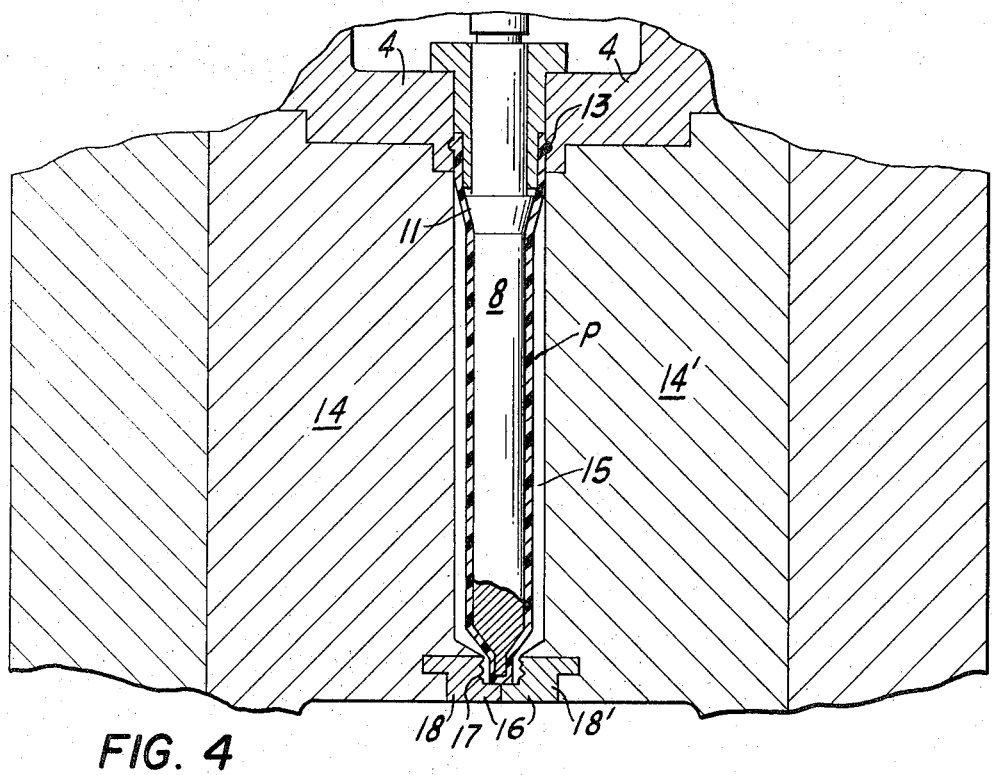
FIG. 4 is a cross-sectional view of a blow mold illustrating the closed blow mold wall sections and separable neck ring wherein threads are to be formed on a blow molded tube.

The parison pin is then transferred to a blow mold, with pin 7, carrying the parison p disposed between blow mold cavity walls 14 and 14', which walls form the tube to the desired shape upon blowing of the parison. The blow mold cavity 15, as shown in FIG. 4, is formed upon closing of the mold wall sections 14 and 14' by these sections, the sealing ring 4 and a separable neck ring 16. The neck ring 16 has threads 17 formed therein, which threads corrspond to the threads desired on the external portion of the neck of the final tube. As illustrated, the neck ring 16 with its threaded interior 17, is separable into two sections 18 and 18' each of which is attached to a respective mold wall section 14 or 14'.

Figure 5:
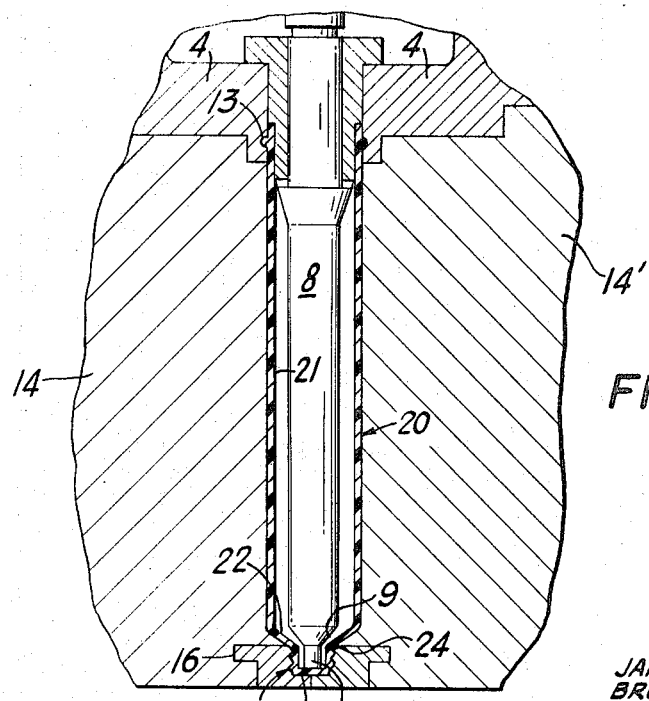
FIG. 5 is a view corresponding to FIG. 4 showing the expansion of the hot parison to the confines of the blow mold cavity, illustrating formation of the threaded neck.
Figure 6:
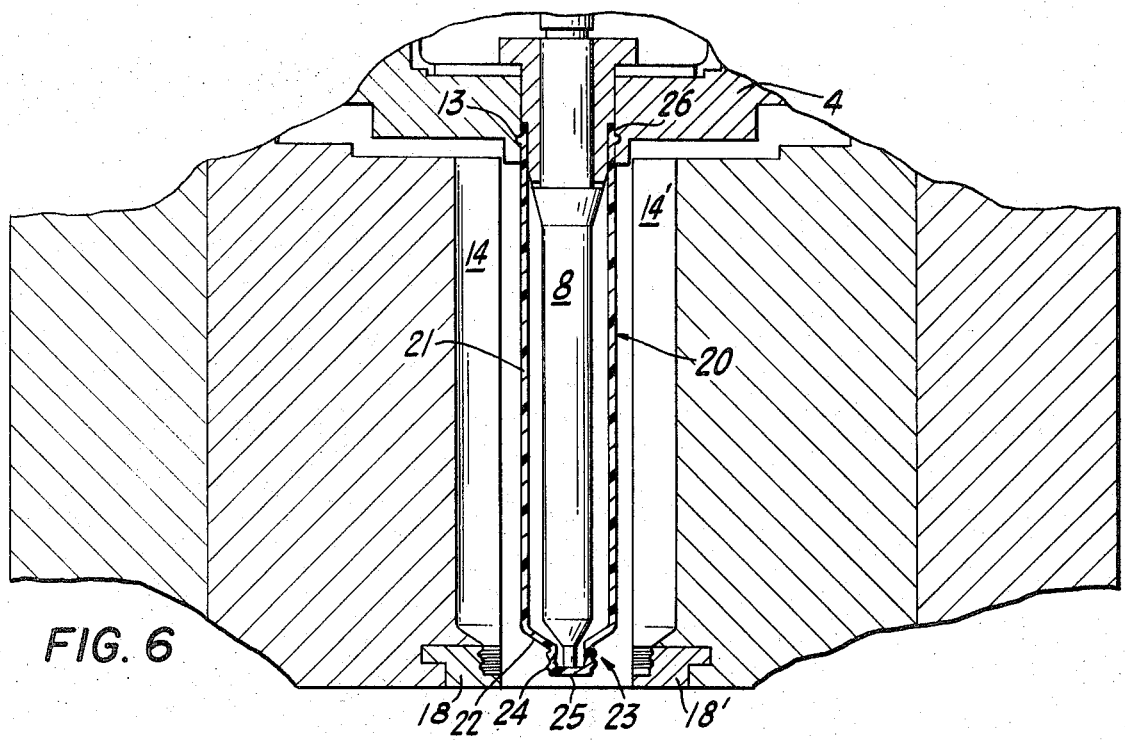
FIG. 6 is a view corresponding to FIG. 5 illustrating the opening of the mold wall sections and neck ring to enable ejection of the blown tube from the mold.
Figure 7:
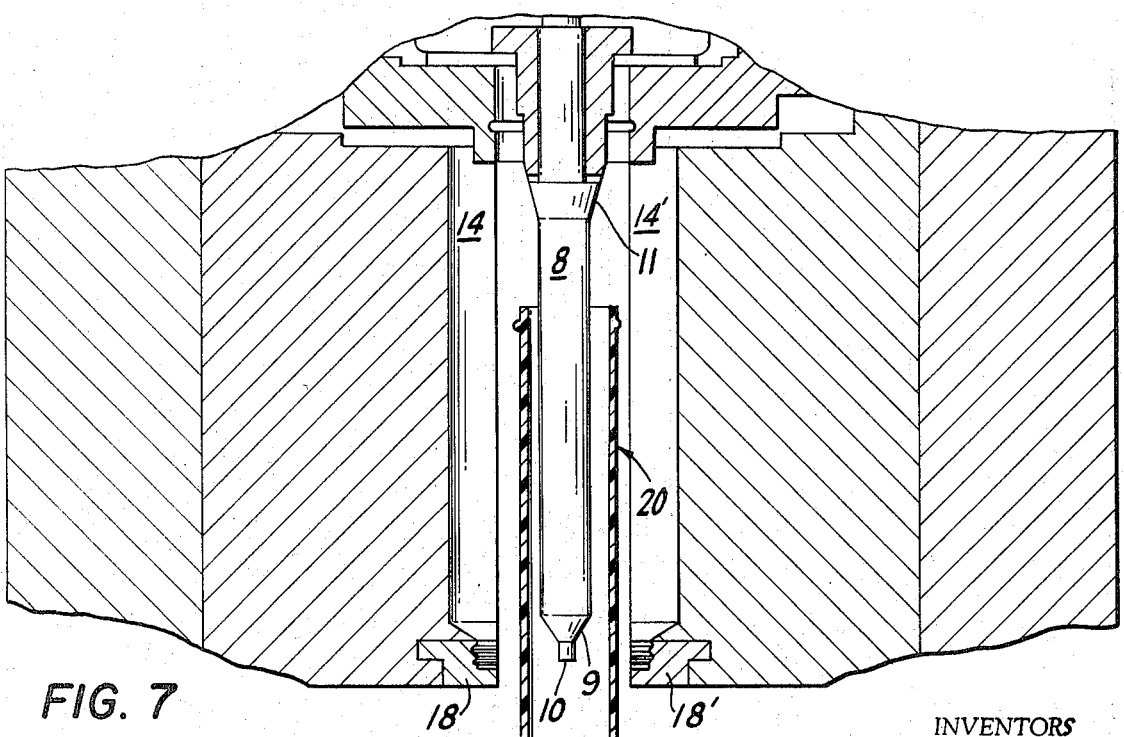
FIG. 7 is a view corresponding to FIG. 5 illustrating the opening of the sealing ring and ejection of the blown tube from the mold.

While the hot parison p is still in a plastic state, and with the parison pin 7 axially disposed between the closed blow mold wall sections 14 and 14', fluid is injected through the parison pin 7, which fluid, such as air, expands the parison p that had encapsulated the pin until it conforms to the dimensions of the cavity 15. As shown in FIG. 5, the thermoplastic material is forced against the confines of the cavity with the tube 20 having a main body portion 21, and a shoulder 22, which shoulder terminates as a neck 23 having external threads 24. A membrane 25, which extends across the neck 24, seals the neck so that the fluid injected through the parison pin conforms the thermoplastic parison to the shape of the blow mold cavity, forming the tube configuration while at the same time forming external threads on the neck of the tube. The tube, at its end opposite the neck, contains a rib 13 therearound, formed from the thermoplastic material that was forced into the groove 5 of the sealing ring 4.

After the tube has been formed by being expanded to the confines of the blow mold cavity, the mold wall sections 14 and 14' are separated. Each section carries with it a corresponding section of the neck ring 16, i.e., 18 with section 14 and 18' with section 14'. The tube, which now has a desired shape and an externally threaded neck is free of the mold cavity walls and neck ring and is held in place solely by the rib 13 and the end portion 26 that is between the sealing ring 4 and the parison pin 7. In order to eject the tube from the blow mold, fluid, such as air, from the parison pin is injected into the interior of the tube immediately following slight opening of the separable sealing ring 4. Upon opening of the sealing ring, the tube if in suspended position may fall, of its own weight, from the blow mold. While other means of removing the blown tube from the mold, such as by a mechanical sweep, may be used, the use of an air blast for ejection of the tube from the blow mold is preferred.

In order to best utilize the present process, it is, of course, advantageous to form a plurality of parisons simultaneously in an injection-blow mold apparatus having a plurality of parison pins and cooperative injection mold cavities and blow mold cavities with said pins. In such devices, a series of pins are mounted on opposed sides of a manifold and the pins are rotated between injection mold cavities and blow mold cavities. An example of such an injection-blow molding apparatus is described in Plastics Technology, March 1970 in an article entitled "Rotating Parison Arm Speeds Output of New Injection Blow Entry." The apparatus described therein is especially applicable to the present invention.

After ejection from the blow mold, the tube comprises a body portion and a shoulder portion which terminates in a narrow sealed neck having external threads, with the end of the tube opposite the neck having a rib around the exterior surface adjacent that end. For some purposes, the tube may be sold in this configuration, or if the customer prefers, further shaping of the tube may be carried out. In a preferred method, the tube is produced in a configuration wherein the ribbed end is trimmed and the sealed neck punctured to provide an orifice. To this end, the tube following discharge from the blow-mold cavity is collected and an orifice drilled or punctured in the membrane which seals the threaded neck. The tube is then trimmed by cutting-off the opposite end of the tube from that end having the neck, at a position adjacent to the rib 13 which is provided around the tube, so as to remove that end of the tube, with the rib, from the main tube body. The drilling and trimming of the tube, following ejection from the blow mold cavity is schematically illustrated in FIG. 8.

Figure 15:
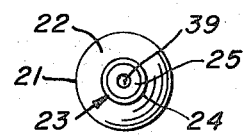
FIG. 15 is a top plan view of the trimmed and punctured tube of the present invention.
Figure 10:
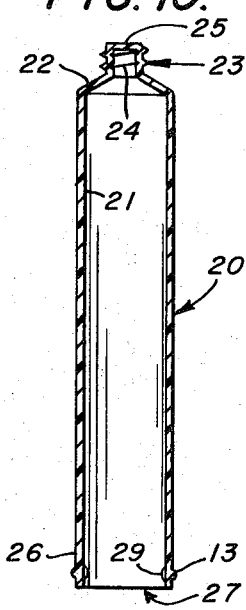
FIG. 10 is a cross-sectional view of the tube illustrated in FIG. 9.
Figure 14:
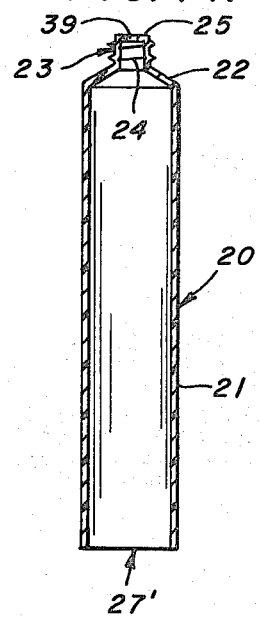
FIG. 14 is a cross-sectional view of the trimmed and punctured tube of the present invention.
Figure 13:
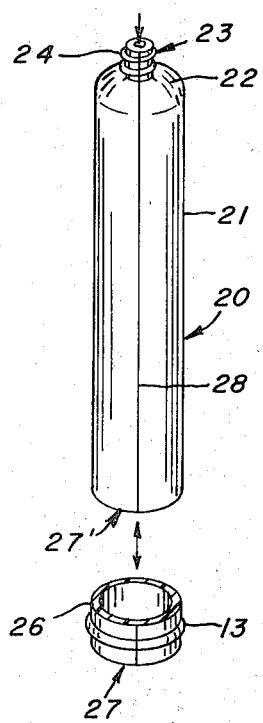
FIG. 13 is an illustration of the components following trimming and puncturing of the tube illustrated in FIG. 9 to give a tube having an orifice in the neck and a trimmed body.
Figure 12:
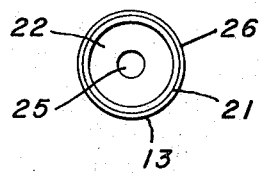
FIG. 12 is a view looking at the bottom of the tube illustrated in FIG. 9.

As schematically illustrated therein, the tubes 20 after ejection from the blow mold are placed in a hopper 30, which hopper changes the tubes to a conveying apparatus 31. The tube 20, is carried by the conveyor to a rotatable table 32, having rotating means 33. The tube is gripped by a holding means 34, which is rotatable with the table, while a drilling device 35, having a drill 36 of the desired size is actuated to puncture the neck membrane 25 of the tube 20. After puncturing of the membrane, the table is rotated so as to position the tube beneath a cutting device 37, such as a blade or hot wire cutter, and the end 26 of the tube having the rib 13 is severed from the tube body so as to provide a tube as illustrated in FIGS. 13-15. The tube 20 is then removed from the table and either stored or packaged for transit in a container 38.

Figure 9:
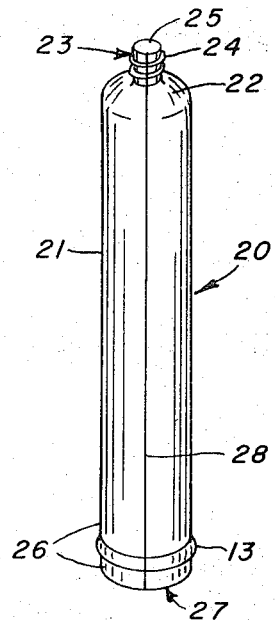
FIG. 9 is a perspective view of the unitary, seamless thermoplastic tube produced according to the present invention illustrating the closed neck membrane and rim.
Figure 11:
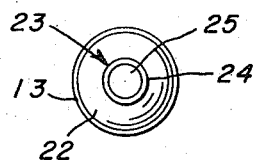
FIG. 11 is a top plan view of the tube illustrated in FIG. 9.

The unitary, seamless injection-blow molded collapsible thermoplastic tubes of the present invention are illustrated in FIGS. 9-15. Referring to FIG. 9, there is illustrated a plastic tube having the construction of a tube upon ejection from the blow mold cavity in the present process. The tube 20, of generally cylindrical shape has a long thin body 21 with the body portion having a shoulder 22 at one end, the shoulder 22 terminating in an externally threaded narrow neck 23. The neck 23, is distinct from the necks of plastic tubes made by prior art practices. The neck 23 has threads 24, which threads are formed by expansion of a parison within a threaded neck ring and thus the threaded neck has a wall of lesser cross-section than that of injection molded necks. This neck 23, is homogeneous with the body portion, both being injection-blow molded portions. The neck 23 also has a membrane 25 which completely seals the neck. As hereinafter described, this membrane enables the formation of different size orifices in a neck of conventional size so that a single tooling is all that is required even though various orifice sizes may be desired in the necks of finished tubes. At the opposite end of the tube body 21 from the neck portion, a rib 13 is present on the body portion 26 adjacent the open end 27 of the tube. The rib 13, adds strength to this area of the tube body. With the formation of the final expanded tube 20 within separable mold wall sections of a blow mold, a parting line 28 will be present along the tube body, which line, although minute, can serve as an indexing means for subsequent decorating or other treatment of the tube. As shown in the cross-sectional view of the tube in FIG. 10, the rib 13 is formed at the end of the tube body which is thickened and which may carry a bead of thermoplastic material 29 around the inside of the tube body conforming with the rib 13.

Figure 8:
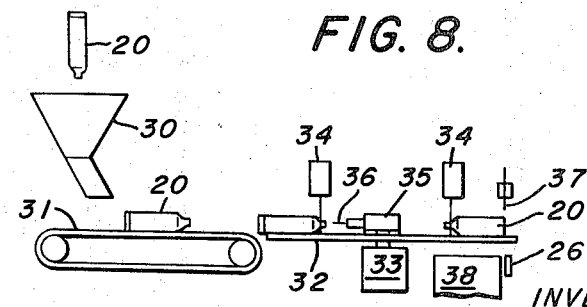
FIG. 8 is a schematic illustration of a means for the trimming of the tube end and puncturing of the tube neck membrane to form an orifice therein.

The tube which is formed upon trimming of the tube body and puncturing of the neck membrane, according to the steps schematically illustrated in FIG. 8, as illustrated in detail in FIGS. 13-15. The open end portion 27 of the tube is trimmed, so that the tube end 26 with the rib 13 thereon is separated from the main body portion 21 and may be recycled to the manufacturing process. The tube neck membrane 25 is punctured so that an orifice 39 of predetermined diameter is formed therein. The diameter of the orifice 39 may be of any predetermined size less than the interior diameter of the threaded neck 23. This tube then also has a blown, threaded narrow neck 23 with threads 24, the neck wall being of a thinner cross-section than an injection molded neck, while the entire tube is a unitary, seamless, injection-blow molded thermoplastic tube.

An important aspect of the present tube is that the preferred tube, with the rib 13 and lower portion thereof removed, comprises a tube which is a completely homogeneous entity. In view of this homogeneity, the tube, should some defect appear therein or should subsequent handling cause rejecting of the tube, can be completely recycled as scrap material. This is a distinct advantage over prior tubes wherein the threaded neck or shoulder portion is formed by a different molding technique than the body of the tube, such as where injection molded necks are welded to extended or blown tube bodies. Portions formed by these different molding techniques, such as in extrusion or injection processed material, are not readily interchangeable with blow-molded portions in reclaiming and require separate reclaiming facilities.

In addition, where coloring material is added in the tube making process of the present invention, homogeneous coloring is achieved throughout the neck and body, while in prior processes, welded, thicker neck portions result in a darker hue in the neck than in the body portion. Not only is the color more homogeneous throughout the tube of the present invention but there is a much smoother transition between the tube body and neck than in tubes made by prior methods.

The present process also enables embossing of the tube wall or identification purposes and the injection-blow molding method eliminates stresses within the tube wall which occur in extrusion-type tube making processes.

We claim:

1. A method for injection-blow molding a unitary, seamless, collapsible thermoplastic tube of a predetermined configuration, the tube having a body portion, a shoulder portion, and an externally threaded neck, comprising:

a. forming a parison by injection of thermoplastic material into an injection mold cavity, the cavity being defined by separable mold wall sections and an axially disposed parison pin therebetween, said parison pin having a body portion and a shoulder portion, which shoulder portion terminates as a narrow neck, the parison pin terminating in a flared portion at the end opposite the narrow neck portion, said flared portion arranged within a sealing ring whereby a groove is formed, with thermoplastic material filling said groove to form a rib around the parison, during forming of said parison;

b. transferirng the parison pin with the resultant parison to a blow-mold cavity, the confines of the blow-mold cavity corresponding to the predetermined configuration of the tube and having a threaded neck portion therein;

c. injecting fluid through the parison pin to expand the parison to the confines of the mold to shape the parison to the predetermined configuration and form a thredod neck on the tube, while said parison is retained on the parison pin adjacent said flared portion thereof by retention of the rib thereon within said grooves; and d. ejecting the expanded and shaped tube having the desired configuration from the blow-mold cavity.

2. The method as defined in claim 1 wherein a sealed threaded neck is formed on the tube, said neck being narrower than said body portion.

3. The method as defined in claim 2 including the step of collecting the tube upon ejection from the blow mold and puncturing the sealed neck to produce an orifice, which orifice has a smaller diameter than the interior diameter of the threaded neck.

4. The method as defined in claim 1 wherein the thermoplastic material is injected into the injection-blow mold cavity at a point adjacent the narrow neck portion of the parison pin.

5. The method as defined in claim 1 wherein a section of the flared portion of the parison pin is positioned within a sealing ring, which ring has an annular groove therearound adjacent the pin, and wherein thermoplastic material injected into the injection mold cavity fills said groove to form a rib around the parison.

6. The method as defined in claim 5 wherein said rib acts to seal the parison from the atmosphere upon injection of fluid into the parison while the parison is confined within a blow mold cavity.

7. The method as defined in claim 5 including the step of trimming the tube body following ejection of the tube from the blow-mold cavity to remove the portion thereof carrying said rib.

8. The method as defined in claim 7 wherein, following the trimming of the tube body, a tube as a homogeneous unit is recycled for use in subsequent forming of parisons by injection of thermoplastic material into an injection mold cavity.

9. The method as defined in claim 1 wherein a plurality of parisons are simultaneously formed on parison pins and said plurality of parisons are simultaneously expanded to said predetermined configuration.

10. The method as defined in claim 9 wherein while a plurality of parisons are formed on parison pins, a further plurality of parisons previously formed on parison pins are being expanded to said predetermined configuration.

11. Method for injection-blow molding a unitary seamless, collapsible thermoplastic tube of a desired configuration, the tube having a body portion, a shoulder portion, and a narrow, externally threaded neck comprising:
  a. forming a parison by injection of thermoplastic material into an injection-mold cavity, the cavity formed between partable mold wall sections and an axially disposed parison pin:
    said pin having a narrow end, a body portion, and a flared portion opposite said narrow end, said flared portion arranged within a sealing ring whereby a groove is formed, with the thermoplastic material injected into the cavity adjacent the narrow end of said pin, said thermoplastic material filling said groove to form a rib around the parison during forming thereof;
  b. transferring said parison pin with the parison thereon to a blow-mold cavity having a threaded, narrow neck portion, corresponding to the desired external thread for the neck of said tube, and a body portion
  c. injecting fluid through said parison pin to expand the parison to the desired configuration while retaining said parison on the pin through retention of the rib of said parison within said groove, during forming of a sealed neck portion having an external thread
  d. ejecting the resultant expanded tube from the blow-mold cavity.

12. The method as defined in claim 11 including the step of puncturing said sealed neck, following ejection of the tube from the blow-mold cavity, to form an orifice therein of a diameter less than the interior diameter of the threaded neck.

* * * * *